United States Patent
Doushita et al.

(10) Patent No.: US 6,835,445 B2
(45) Date of Patent: Dec. 28, 2004

(54) MAGNETIC RECORDING MEDIUM

(75) Inventors: Hiroaki Doushita, Kanagawa (JP); Takeshi Harasawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/650,807

(22) Filed: Aug. 29, 2003

(65) Prior Publication Data

US 2004/0043257 A1 Mar. 4, 2004

(30) Foreign Application Priority Data

Aug. 30, 2002 (JP) ..................... P.2002-253452

(51) Int. Cl.$^7$ .............................. G11B 5/714
(52) U.S. Cl. ................ 428/216; 428/403; 428/328; 428/694 BA; 428/694 BS; 428/694 BB
(58) Field of Search ............... 428/328, 403, 428/216, 694 BA, 694 BS, 694 BB

(56) References Cited

U.S. PATENT DOCUMENTS 5,989,680 A * 11/1999 Wakana et al. ............. 428/141

FOREIGN PATENT DOCUMENTS

| JP | 4-71244 B2 | | 11/1992 |
| JP | 2001-068314 | * | 3/2001 |
| JP | 2001-143243 A | | 5/2001 |

* cited by examiner

Primary Examiner—Stevan A. Resan
(74) Attorney, Agent, or Firm—Sughrue Mion, PLLC

(57) ABSTRACT

A magnetic recording medium comprising: a support; and a magnetic layer comprising ferromagnetic metal powder and a binder, wherein the ferromagnetic metal powder is acicular composite magnetic particle powder having an average long axis length of from 20 to 50 nm, and at least a part of a surface of the particle powder is covered with carbon black.

15 Claims, No Drawings

MAGNETIC RECORDING MEDIUM

FIELD OF THE INVENTION

The present invention relates to a magnetic recording medium capable of high density recording and excellent in electromagnetic characteristics and running durability.

BACKGROUND OF THE INVENTION

Magnetic heads making electromagnetic induction as a principle of operation (an induction type magnetic head) have been conventionally used and prevailed. However, there are the limits to their abilities for further higher density recording and reproduction use, and a magnetic head making MR (magneto resistance) as a principle of operation has been proposed and is coming to be used in a hard disc and the like. An MR head can provide reproduction output of several times as large as that by an induction type magnetic head and, since no induction coil is used, equipment noise such as impedance noise is widely reduced, therefore, it has become possible to obtain a great S/N ratio by reducing the noise of a magnetic recording medium. A magnetic recording layer suitable for an MR head has also been discussed in conventionally used coating type magnetic recording media excellent in productivity and capable of manufacturing inexpensively. A magnetic recording medium comprising a nonmagnetic support having provided thereon in the order of a substantially nonmagnetic lower layer and a magnetic layer comprising ferromagnetic fine powder dispersed in a binder is broadly used in the coating type magnetic recording medium for high density recording of the day as a means of capable of realizing thinning of a magnetic layer while maintaining surface smoothness of the magnetic recording medium (refer to JP-B-4-71244 (the term "JP-B" as used herein means an "examined Japanese patent publication")).

It is important to make the particle size of magnetic powder smaller in order to realize high density recording. However, a problem such that noise increases particularly when the particle size of magnetic powder becomes small has arisen during the development of a coating type magnetic recording medium having a real recording density of higher than 0.3 G bit/inch$^2$. When the particle size of magnetic powder is made small, dispersion of the magnetic powder in a binder becomes difficult at the time of preparation of a magnetic layer-coating solution, so that the smoothness of the magnetic layer surface cannot be maintained, as a result it becomes difficult to obtain an objective low noise medium. For holding down the noise, it is necessary (1) to get rid of the agglomeration of magnetic particles, and (2) to smooth the magnetic layer surface.

Good running durability is also required of a magnetic recording tape in addition to excellent electromagnetic characteristics. When magnetic powder is atomized, running durability is liable to deteriorate even if surface smoothness is the same degree. Accordingly, it is effective to add nonmagnetic carbon black fine powder to a magnetic recording layer in order to ensure running stability. However, the addition of an excessive amount of carbon black not only degrades electromagnetic characteristics and impedes higher density recording but causes hindrance of thinning of a magnetic recording layer. At the same time, carbon black fine powder is difficult to disperse, since it has such characteristics that a specific surface area ($S_{BET}$) is great and a wetting property by a solvent is low, so that it is difficult to obtain a magnetic recording medium having a smooth surface.

For example, it is proposed in JP-A-2001-143243 (the term "JP-A" as used herein means an "unexamined published Japanese patent application") to improve running performance by adhering carbon black to magnetic powder. However, the surface roughness of a medium prepared in practice is rough and it is not sufficient as the magnetic recording medium loaded with an MR head. Further, the same patent does not specifically disclose the improvement of electromagnetic characteristics.

Thus, the prior art techniques have not provided yet a magnetic recording medium sufficiently excellent in both electromagnetic characteristics and running durability.

SUMMARY OF THE INVENTION

The objects of the present invention are to solve the problems of the prior art technique and provide a magnetic recording medium for an MR head which is low in noise, high in capacity and has good running durability.

As a result of eager investigation to achieve the above objects of the invention, the present inventors have attained the above objects by a magnetic recording medium comprising a support having provided thereon a magnetic layer mainly comprising ferromagnetic metal powder and a binder, wherein the ferromagnetic metal powder is acicular composite magnetic particle powder having an average long axis length of from 20 to 50 nm, and at least a part of the surface of the particle is adhered with carbon black. Further, it is preferred to provide a substantially nonmagnetic lower layer between the magnetic layer and the support of the magnetic recording medium.

DETAILED DESCRIPTION OF THE INVENTION

The acicular composite magnetic particle powder for use in the magnetic layer of the invention is acicular composite magnetic particle powder having an average long axis length of from 20 to 50 nm, preferably from 20 to 45 nm, and at least a part of the surface of ferromagnetic metal powder (also referred to as core particle powder) is adhered with carbon black.

By using acicular composite magnetic particle powder, the present invention can improve the C/N ratio, weather resistance and running performance of a magnetic recording medium.

The acicular composite magnetic particle powder is obtained by adhering carbon black on a part of the surfaces or entire surfaces of the core particles. Adhesion of carbon black in the present invention may be physical adsorption of carbon black onto the core particle surfaces, or may be bond of carbon black to the core particle surfaces by covalent bond, but it is preferred that the adhesion state is retained in the magnetic layer of a magnetic recording medium in each case. By using the acicular composite magnetic particle powder which is obtained by adhering carbon black to the surfaces of core particles in the magnetic layer, dispersibility is increased, by which a surface property is ensured and a C/N ratio is improved and, at the same time, the friction coefficient of the magnetic surface can be suppressed even under high temperature high humidity conditions, thereby running durability can better.

A method of adhering carbon black to core particle powder is not particularly restricted, but it is preferred that the surfaces of core particles are previously treated before adhering carbon black to the core particle powder. The pretreatment is not particularly restricted and any of well-known methods can be used. As the pretreatment, adhesion of resins, e.g., a silicone resin, an acrylate resin and an epoxy resin, and other compounds to core particle surfaces is exemplified, and the treatment of adhering a silane compound is preferred. The material to be adhered to core particle powder by the pretreatment is called a pretreatment material.

The adhesion amount by these pretreatment materials is preferably from 0.1 to 10 mass % (wight %), and more preferably from 0.3 to 8 mass %, based on the core particle powder. When the adhesion amount is less than 0.1 mass %, it is difficult to sufficiently adhere carbon black, and when it is more than 10 mass %, the effect is saturated and the addition has no means, although carbon black can be adhered sufficiently. The weather resistance of acicular composite magnetic particle powder, i.e., the weather resistance of a magnetic layer, can be improved by adhering a pretreatment material to core particle powder.

A method of pretreatment of core particle powder by using a silicone compound is described below, but this method is also applicable to other pretreatment materials.

The adhesion treatment of core particle powder with a silicone compound may be performed by mechanically mixing and stirring core particle powder and a silicone compound, or mechanically mixing and stirring while spraying a silicone compound to core particle powder. A silicone compound may be used as it is or may be used as a solution. Further, a catalyst, e.g., water or hydrochloric acid may be arbitrarily added to the solution.

A silicone compound may be used as it is or may be oligomerized or polymerized by a siloxane bonding reaction.

As the silicone compounds, alkoxysilane compounds and polysiloxane compounds are preferred.

As the alkoxysilane compounds, tetraalkoxysilane, monoalkyltrialkoxysilane, dialkyldialkoxysilane and trialkyl-alkoxysilane are exemplified, and these compounds are used alone or in combination.

As the alkoxysilane compounds, tetramethoxysilane, tetraethoxysilane, tetra-n-propoxysilane, tetra-i-propoxysilane, methyltriethoxysilane, ethyltriethoxysilane, n-propyltriethoxysilane, dimethyldiethoxysilane and diethyldiethoxysilane are exemplified.

As the polysiloxane compounds, organopolysiloxane compounds are preferred. As the substituents substituted on the organopolysiloxane compounds, lower alkyl groups, e.g., a methyl group and an ethyl group, a phenyl group, and as functional groups, e.g., a hydroxyl group, a carboxyl group, an epoxy group, a vinyl group, an acryloyl group and a methacryloyl group are exemplified. It is preferred that a functional group is directly bonded to a silicon atom or via a divalent linking group, e.g., an alkylene group, a carbonyl group or an oxy group, alone or in combination.

The number of siloxane bond, mass average molecular weight and the number of substituent of the polysiloxane compound are arbitrarily selected by the kind and the like of the ferromagnetic metal powder and the carbon black to be used.

After adhering a silicone compound to the particle surface of core particle powder, carbon black is added, and they are mixed and stirred to adhere the carbon black to the silicone compound, and then the mixture is dried or subjected to heat treatment.

In the present invention, the total adhesion amount of carbon black is preferably from 0.5 to 40 mass parts per 100 mass parts of the core particle powder. When the amount is less than 0.5 mass parts, it is difficult to obtain magnetic particle powder having a low volume resistivity, since the adhesion amount of carbon black is small. When the amount is more than 40 mass parts, the improvement of the volume resistivity of the obtained particle powder is saturated, thus the addition of more than a necessary amount has no means. Commercially available furnace black and channel black can be used as the carbon black fine powders. The average particle size of carbon blacks to be used in adhesion treatment is preferably from 2 to 10 nm, and more preferably from 2 to 5 nm. When the average particle size of carbon blacks to be used in adhesion treatment is less than 2 nm, handling is difficult, since the particle size of the carbon black is too fine. While when it exceeds 10 nm, a very great mechanical shear strength is required to uniformly adhere the carbon black to the core particle powder, since the particle size of the carbon black is too great, which is industrially disadvantageous.

The particle figure and particle size of the acicular composite magnetic particle powder in the present invention are greatly dependent on the particle figure and particle size of the core particle powder. The acicular composite magnetic particle powder has a figure similar to that of the core particle powder, and a particle size slightly greater than the size of the core particle. That is, the acicular composite magnetic particle powder in the invention has an average long axis length of from 20 to 50 nm, and preferably from 20 to 45 nm. The acicular composite magnetic particle powder has an average acicular ratio [the average of (long axis length/short axis length)] of preferably from 2.0 to 6.5, and more preferably from 2.5 to 5.5.

Prior to the pretreatment, if necessary, the particle surface of the core particle powder of the acicular composite magnetic particle powder in the present invention may be covered with one or two or more compounds selected from aluminum hydroxide, aluminum oxide, silicon hydroxide and silicon oxide.

Ferromagnetic metal powders which are used as the core particle powder have a specific surface area ($S_{BET}$) measured by the BET method of generally from 40 to 100 m²/g, preferably from 50 to 80 m²/g, a crystallite size of generally from 8 to 20 nm, and preferably from 10 to 18 nm, and an average long axis length of preferably from 20 to 45 nm, and more preferably from 25 to 45 nm. When a magnetic layer is formed with core particle powder having an average long axis length exceeding 45 nm, noise increases at the time of short wave recording and the S/N ratio is liable to be impaired. When the average long axis length is less than 20 nm, agglomeration is liable to occur by the increase of intermolecular force due to atomization of the particles, so that uniform pretreatment and dispersion treatment become difficult. The examples of core particle powders include simple metal powders or alloys, e.g., Fe, Ni, Fe—Co, Fe—Ni, Co—Ni and Co—Ni—Fe. The core particle powders can contain the following metals in the proportion of 20 wt % or less of the metal ingredients: aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium and bismuth. Further, the core particle powders may contain a small amount of water, a hydroxide or an oxide. The producing methods of these core particle powders are well-known, and the core particle powders for use in the present invention can also be produced according to well-known methods. The figures of the core particle powders are not particularly limited so long as the acicular ratio of the acicular composite magnetic particle powder can be obtained, e.g., acicular, spindle-like and ellipsoidal figures are exemplified.

In the present invention, a magnetic layer-forming coating solution is produced by kneading and dispersing a binder, a hardening agent and acicular composite magnetic particle powder with a solvent generally used in preparing a magnetic coating solution, e.g., methyl ethyl ketone, dioxane, cyclohexanone or ethyl acetate. Kneading and dispersing can be performed according to ordinary methods. In addition to the above ingredients, a magnetic layer-forming coating solution may contain generally-used additives and fillers, such as abrasives, e.g., alpha-$Al_2O_3$ and $Cr_2O_3$, antistatic agents, e.g., carbon black, lubricants, e.g., fatty acid, fatty acid ester and silicone oil, and dispersants.

Since carbon black is adhered to the acicular composite magnetic particle powder of the invention, not only the amount of antistatic agents such as carbon black can be reduced to a lower level than an ordinary amount, but also antistatic effect betters.

Binders and additives which are used in a backing layer described later can be arbitrarily used in a magnetic layer.

The magnetic recording medium of the invention widely includes media comprising a support having a magnetic layer on one side and a backing layer on the opposite side of the support. Accordingly, a magnetic recording medium having layers other than a magnetic layer and a backing layer is also included in the magnetic recording medium of the invention. For example, a magnetic recording medium may comprise a nonmagnetic layer containing nonmagnetic powder, a soft magnetic layer containing soft magnetic powder, a second magnetic layer, a cushioning layer, an overcoat layer, an adhesion layer and a protective layer. These layers can be provided at appropriate places so that their functions can be effectively exhibited. A magnetic recording medium having a lower nonmagnetic layer containing nonmagnetic inorganic powder and a binder between a support and a magnetic layer is preferred as the magnetic recording medium of the invention. A magnetic layer can have a layer thickness of, e.g., from 0.03 to 1 $\mu$m, and a lower nonmagnetic layer can have a layer thickness of from 0.5 to 3 $\mu$m. The layer thickness of a lower nonmagnetic layer is preferably thicker than the thickness of a magnetic layer. When a soft magnetic layer is provided between a support and a magnetic layer, the magnetic layer thickness may be, e.g., from 0.03 to 1 $\mu$m, preferably from 0.05 to 0.5 $\mu$m, and the soft magnetic layer thickness may be from 0.8 to 3 $\mu$m.

In the next place, a lower nonmagnetic layer or a lower magnetic layer (hereinafter a lower nonmagnetic layer or a lower magnetic layer is also referred to as a lower layer) is described below. The inorganic powders used in a lower layer may be magnetic powder or may be nonmagnetic powder. For example, the nonmagnetic powder can be selected from inorganic compounds, e.g., metallic oxide, metallic carbonate, metallic sulfate, metallic nitride, metallic carbide and metallic sulfide, and nonmagnetic metals. The examples of the inorganic compounds are selected from the following compounds and they can be used alone or in combination, e.g., titanium oxides ($TiO_2$, $TiO$), alpha-alumina having an alpha-conversion rate of from 90% to 100%, beta-alumina, gamma-alumina, alpha-iron oxide, chromium oxide, zinc oxide, tin oxide, tungsten oxide, vanadiumoxide, silicon carbide, cerium oxide, corundum, silicon nitride, titanium carbide, silicon dioxide, magnesium oxide, zirconium oxide, boron nitride, calcium carbonate, calcium sulfate, barium sulfate, molybdenum disulfide, goethite and aluminum hydroxide. Of these inorganic compounds, titanium dioxide, zinc oxide, iron oxide and barium sulfate are particularly preferred, and titanium dioxides disclosed in JP-A-5-182177, and alpha-iron oxides disclosed in JP-A-6-60362 and JP-A-9-170003 are more preferred. As the nonmagnetic metals, Cu, Ti, Zn and Al can be exemplified. These non magnetic powders preferably have an average particle size of from 0.005 to 2 $\mu$m. A plurality of nonmagnetic powders each having a different particle size may be combined, if necessary, or a single nonmagnetic powder having a broad particle size distribution may be used so as to obtain the same effect as such a combination. Particularly preferred nonmagnetic powders are those having an average particle size of from 0.01 to 0.2 $\mu$m. Nonmagnetic powders have a pH value of particularly preferably from 6 to 9, a specific surface area ($S_{BET}$) of from 1 to 100 $m^2/g$, preferably from 5 to 50 $m^2/g$, and more preferably from 7 to 40 $m^2/g$, a crystallite size of preferably from 0.01 to 2 $\mu$m, an oil absorption amount using DBP of from 5 to 100 ml/100 g, preferably from 10 to 80 ml/100 g, and more preferably from 20 to 60 ml/100 g, and a specific gravity of from 1 to 12, and preferably from 3 to 6. The figure of nonmagnetic powders may be any of acicular, spherical, polyhedral and tabular figures.

As the soft magnetic powders, particulate Fe, Ni, particulate magnetite, Fe—Si, Fe—Al, Fe—Ni, Fe—Co, Fe—Co—Ni, Fe—Al—Co (Sendust) alloys, Mn—Zn ferrite, Ni—Zn ferrite, Mg—Zn ferrite, Mg—Mn ferrite, and other soft magnetic powders described in Fusanobu Chikazumi, *Kyojiseitai no Butsuri (Ge)* (*Physics of Ferromagnetic Substances (the last volume)*), "Jiki Tokusei to Oyo (Magnetic Characteristics and Applications)", pp. 368 to 376, Shokabo Co. (1984) are exemplified. It is preferred that at least a part of the surfaces of these nonmagnetic powders and soft magnetic powders are covered with any of $Al_2O_3$, $SiO_2$, $TiO_2$, $ZrO_2$, $SnO_2$, $Sb_2O_3$ and $ZnO_2$, of these compounds, $Al_2O_3$, $SiO_2$, $TiO_2$ and $ZrO_2$ are especially preferred in the point of capable of exhibiting good dispersibility, and $Al_2O_3$, $SiO_2$ and $ZrO_2$ are further preferred. They may be used alone or in combination. Further, surface treatment of particles may be performed by coprecipitation, alternatively, surface treatment may be performed to be covered with alumina in the first place, then the alumina-covered surface may be covered with silica, or vice versa, according to purposes. A surface-covered layer may be porous, if necessary, but a homogeneous and dense surface is generally preferred.

By incorporating carbon blacks into a lower layer, surface electrical resistance (Rs) can be reduced and a desired micro Vickers hardness can be obtained. The average particle size of carbon blacks (the arithmetic mean of particle sizes) is generally from 5 to 80 nm, preferably from 10 to 50 nm, and more preferably from 10 to 40 nm. Specifically, the carbon blacks which can be used in the later-described backing layer can be used in a lower layer. Further, magnetic powders can also be used in the lower layer of the present invention as inorganic powder. As the magnetic powders, gamma-$Fe_2O_3$, Co-modified gamma-$Fe_2O_3$, and alloys comprising alpha-Fe as the main component, and $CrO_2$ are used. The magnetic powder for the lower layer can be selected according to the purpose, and the effect of the present invention does not depend upon the kinds of magnetic powders. However, as is well known, the performances may be varied in the upper layer and the lower layer. For example, to improve long wave recording characteristics, it is preferred to set Hc of the lower magnetic layer at a lower value than Hc of the upper magnetic layer, and it is effective to make Br of the lower magnetic layer higher than Br of the upper magnetic layer. Other than the above means, advantages can be given by using well-known multilayer structures. The binders, lubricants, dispersants, additives, solvents, dispersing methods, and the like used in the magnetic layer can be used in the lower magnetic layer and the lower nonmagnetic layer. In particular, with respect to the amounts and the kinds of binders, additives, and the amounts and the kinds of dispersants, well-known techniques regarding the magnetic layer can be applied to the lower layer.

As the supports which can be used in the present invention, biaxially stretched polyethylene naphthalate (PEN), polyethylene terephthalate (PET), polyamide, polyimide, polyamideimide, aromatic polyamide, and polybenzobisoxazole are exemplified. These nonmagnetic supports may be subjected to surface treatments in advance, e.g., corona discharge treatment, plasma treatment, adhesion assisting treatment and heat treatment. The nonmagnetic supports which can be used in the present invention have a central line average surface roughness (at a cut-off value of 0.25 mm) of generally from 0.1 to 20 nm, preferably from 1 to 10 nm, and preferably have excellent surface smoothness. It is also preferred that these nonmagnetic supports not only have a small central line average surface roughness but are free of coarse pimples of 1 $\mu$m or more. The thickness of the nonmagnetic support is generally from 4 to 15 $\mu$m, and preferably from 4 to 9 $\mu$m. When the thickness of the nonmagnetic support is thin, since the concavities and convexities of a backing layer are liable to be impressed on a magnetic layer due to handling tension, the setoff can be effectively prevented by using polyurethane resin, which is used in a backing layer described later, as the uppermost layer of a magnetic layer. When the thickness of the nonmagnetic support is 7 $\mu$m or less, PEN or aromatic polyamide such as aramid is preferably used as the support. Aramid is most preferred.

In the magnetic recording medium of the invention, it is preferred to provide a backing layer on the side of the support opposite to the side on which a magnetic layer is provided. Further, the use of a backing layer having a specific composition as described later can reduce the setoff of the backing layer to the magnetic layer and can contribute to the improvement of C/N ratio.

It is preferred to use inorganic oxide powders in a backing layer. As the inorganic oxide powders, it is preferred to use any of titanium oxide, alpha-iron oxide, and mixtures of these oxides. Ordinarily used titanium oxides and alpha-iron oxides can be used. The figures of the particles are not restricted. When spherical titanium oxide or alpha-iron oxide is used, oxides having a particle size of from 0.01 to 0.1 $\mu$m are preferably used for ensuring the film strength of the backing layer itself. When acicular titanium oxide or alpha-iron oxide is used, oxides having an acicular ratio of from 2 to 20 are preferably used, and from 3 to 10 are more preferred. Oxides having a long axis length of from 0.05 to 0.3 $\mu$m and a short axis length of from 0.01 to 0.05 $\mu$m are also preferred. Inorganic oxide powders at least a part of the surfaces of which is covered with at least one compound selected from $Al_2O_3$, $SiO_2$, $TiO_2$, $ZrO_2$, $SnO_2$, $Sb_2O_3$ and $ZnO_2$ are preferred, above all, inorganic oxide powders covered with at least one compound selected from $Al_2O_3$, $SiO_2$ and $ZrO_2$ are especially preferred in the point of being excellent in the dispersibility in a binder. Such inorganic oxide powders can be obtained by synthesizing titanium oxide or alpha-iron oxide particles and then by treatment such as depositing or coating other compounds as above on the surfaces of the synthesized particles, or by coprecipitating titanium oxide or alpha-iron oxide and at least one compound selected from $Al_2O_3$, $SiO_2$, $TiO_2$, $ZrO_2$, $SnO_2$, $Sb_2O_3$ and $ZnO_2$.

These inorganic oxide powders are also commercially available. For example, DPN-245, DPN-250, DPN-250BX, DPN-270BX, DPN-550BX, DPN-550RX, TF-100 and TF-120 (manufactured by Toda Kogyo Co., Ltd.), TTO-51A, TTO-51B, TTO-51C, TTO-53B, TTO-55A, TTO-55B, TTO-55C, TTO-55D, TTO-55N, TTO-55S, TTO-S-1, TTO-S-2, TTO-M-1, TTO-M-2, TTO-D-1, TTO-D-2, SN-100, E270 and E271 (manufactured by Ishihara Sangyo Kaisha Ltd.), STT-4D, STT-30D, STT-30 and STT-65C (manufactured by Titan Kogyo Co., Ltd.), MT-100F, MT-100S, MT-100T, MT-150W, MT-500B, MT-500HD and MT-600B (manufactured by Teika Co., Ltd.), $TiO_2P_{25}$ (manufactured by Nippon Aerosil Co., Ltd.), and Super Titania (manufactured by Showa Denko Co., Ltd.) are exemplified.

It is preferred to use carbon black in a backing layer for the purpose of electrostatic charge prevention. Carbon blacks generally used in magnetic recording media can be widely used in a backing layer. For example, furnace blacks for rubbers, thermal blacks for rubbers, carbon blacks for coloring, and acetylene blacks can be used. The particle size of carbon blacks is preferably 0.3 $\mu$m or less for the purpose of preventing the pimples (protrusions) of a backing layer from being impressed on a magnetic layer. An average particle size here means the arithmetic mean of the particle sizes of independent particles free of agglomeration. A particularly preferred particle size of carbon blacks is from 0.01 to 0.1 $\mu$m. Carbon blacks for use in a backing layer have pH of from 2 to 10, a water content of from 0.1 to 10%, a tap density of from 0.1 to 1 g/ml, a specific surface area of generally from 100 to 500 m$^2$/g, preferably from 150 to 400 m$^2$/g, and a DBP oil absorption of generally from 20 to 400 ml/100 g, and preferably from 30 to 200 ml/100 g. The specific examples of carbon blacks for use in a backing layer in the present invention include BLACK PEARL S2000, S1300, S1000, S900, S800, S880 and S700, and VULCAN XC-72 (manufactured by Cabot Co., Ltd.), #3050B, #3150B, #3250B, #3750B, #3950B, #950, #650B, #970B and #850B, and MA-600 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), Ketjen Black EC (manufactured by Akzo Co., Ltd.), #55, #50 and #30 (manufactured by Asahi Carbon Co., Ltd.), RAVEN 450 and 430 (manufactured by Columbia Carbon Co., Ltd.), and THERMAX MT (manufactured by Cancarb Co., Ltd.).

As the binder for a backing layer of the present invention, well-known thermoplastic resins, thermo-setting resins and reactive type resins can be used. The examples of preferred binders include a vinyl chloride resin, a vinyl chloride-vinyl acetate resin, cellulose resins, e.g., a nitrocellulose, a phenoxy resin and a polyurethane resin. Of these resins, a vinyl chloride resin, a vinyl chloride-vinyl acetate resin and a polyurethane resin are more preferably used, since the hardness of a backing layer approaches the hardness of a magnetic layer, as a result, the setoff can be reduced.

The polyurethane resin preferably contains at least one polar group selected from the following groups in the molecule, e.g., —SO$_3$M, —OSO$_3$M, —COOM, —PO$_3$MM', —OPO$_3$MM', —NRR' and —N$^+$RR'R"COO$^-$ (wherein M and M' each represents a hydrogen atom, an alkaline metal, an alkaline earth metal or ammonium, R and R' each represents an alkyl group having from 1 to 12 carbon atoms, and R" represents an N-bonded alkylene group having from 1 to 12 carbon atoms), and —SO$_3$M and —OSO$_3$M are particularly preferred. The addition amount of these polar groups is preferably from $1 \times 10^{-5}$ to $2 \times 10^{-4}$ eq/g, and particularly preferably from $5 \times 10^{-5}$ to $1 \times 10^{-4}$ eq/g. When the amount is less than $1 \times 10^{-5}$ eq/g, the adsorption onto inorganic powder becomes insufficient, thus dispersibility is liable to lower, and when the amount is more than $2 \times 10^{-4}$ eq/g, the solubility in a solvent lowers, thus dispersibility is liable to lower.

The number average molecular weight (Mn) of polyurethane resins is preferably from 5,000 to 100,000, more preferably from 10,000 to 50,000, and particularly preferably from 2,000 to 40,000. When the number average molecular weight of polyurethane resins is less than 5,000, the strength of the film and durability are low. When it is more than 100,000, the solubility and dispersibility in a solvent are low. Polyurethane resins preferably have a cyclic structure and an ether group. The cyclic structure of polyurethane resins contributes to stiffness and the ether group contributes to flexibility. Polyurethane resins preferably have Tg of from 80 to 140° C.

Ingredients other than inorganic oxide powder, carbon black and a binder can be arbitrarily used in a backing layer of the magnetic recording medium of the invention. It is preferred that a backing layer contains a lubricant. As the lubricant, fatty acid, fatty acid ester, and fatty acid amide are exemplified. In particular, it is indispensable to contain fatty acid for inhibiting the rising of friction coefficient in repeating running while maintaining the strength. By using fatty acid ester or an abrasive having a Moh's hardness of 8 or more, the rising of friction coefficient in repeating running can be inhibited and sliding durability can be improved. By using an aromatic organic acid compound and a titanium coupling agent, dispersibility is improved and strength is heightened, thereby the rising of friction coefficient can also be inhibited. Further, the rising of friction coefficient is inhibited by adding organic powder, thereby the setoff can be reduced. The examples of fatty acids which can be used include a monobasic fatty acid having from 8 to 24 carbon atoms, and a monobasic fatty acid having from 8 to 18 carbon atoms is preferred, above all. The specific examples of these fatty acids include a lauric acid, a caprylic acid, a myristic acid, a palmitic acid, a stearic acid, a behenic acid, an oleic acid, a linoleic acid, a linolenic acid and an elaidic acid. Amides of these fatty acids can also be used.

The examples of fatty acid esters include mono-fatty acid esters, di-fatty acid esters or tri-fatty acid esters comprising a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched). The specific examples of these fatty acidesters include butyl stearate, octyl stearate, amyl stearate, isooctyl stearate, octyl myristate, butoxyethyl stearate, anhydrosorbitan monostearate, anhydrosorbitan distearate and anhydrosorbitan tristearate.

The addition amount of lubricants is preferably from 0.1 to 5 mass parts, and more preferably from 0.1 to 3 mass parts, with the total amount of the inorganic oxide powder and the carbon black as 100 mass parts.

As the abrasives having a Moh's hardness of 8 or more, alpha-alumina, chromium oxide, artificial diamond, and carbon-modified boron nitride (CBN) can be exemplified. Above all, it is preferred to use abrasives having an average particle size of 0.2 μm or less and particle sizes which are less than the thickness of a backing layer. The height of pimples from the surface of a backing layer is preferably 30 nm or less in order to reduce the setoff of a backing layer. Since a backing layer can be thinned in the present invention, sufficient sliding durability can be secured by the addition of even a small amount of abrasive. As the aromatic organic acid compound, a phenylphosphonic acid is preferably used. The addition amount of the aromatic organic acid compound is from 0.03 to 10 mass parts, and preferably from 0.5 to 5 mass parts, with the total amount of the inorganic oxide powder and the carbon black as 100 mass parts.

As the organic powder, acrylic-styrene copolymer resin powders, benzoguanamine resin powders, melamine resin powders, and phthalocyanine pigments can be used.

The glass transition temperature of a backing layer is preferably from 60 to 120° C., and the dry thickness of a backing layer is generally from 0.05 to 1.0 μm or so.

Since the pimples of a backing layer are hardly impressed on a magnetic layer in the magnetic recording medium of the invention even when the medium is wound with high tension and stored, it is possible to make the tape thickness from 4 to 9 μm.

The magnetic recording medium of the present invention can be manufactured by, e.g., vacuum evaporating or coating a coating solution on the surface of a nonmagnetic support under running so that the dry thickness of the layer comes into the prescribed range. A plurality of magnetic coating solutions or nonmagnetic coating solutions can be multilayer-coated sequentially or simultaneously. Air doctor coating, blade coating, rod coating, extrusion coating, air knife coating, squeeze coating, immersion coating, reverse roll coating, transfer roll coating, gravure coating, kiss coating, cast coating, spray coating and spin coating can be used for magnetic layer coating. Regarding these methods, e.g., *Saishin Coating Gijutsu* (*The Latest Coating Techniques*), Sogo Gijutsu Center Co. (May 31, 1983) can be referred to. When a magnetic recording medium having two or more layers on one side of a support is manufactured, e.g., the following methods can be used.

(1) A method of coating a lower layer by any of gravure coating, roll coating, blade coating, and extrusion coating apparatus, which are ordinarily used in the coating of a magnetic coating solution, and then coating an upper layer while the lower layer is still wet by means of the support-pressing type extrusion coating apparatus disclosed, e.g., in JP-B-1-46186 (the term "JP-B" as used herein means an "examined Japanese patent publication"), JP-A-60-238179 and JP-A-2-265672.

(2) A method of coating an upper layer and a lower layer almost simultaneously by using the coating head equipped with two slits for feeding coating solution disclosed in JP-A-63-88080, JP-A-2-17971 and JP-A-2-265672.

(3) A method of coating an upper layer and a lower layer almost simultaneously by using the extrusion coating apparatus equipped with a backup roll disclosed in JP-A-2-174965.

The backing layer can be provided on the side of a support on which a magnetic layer is not coated by coating a backing layer-forming coating solution comprising particulate ingredients, e.g., an abrasive and an antistatic agent, and a binder dispersed in an organic solvent. A sufficient dispersibility can be obtained by making the use amount of inorganic oxide powder greater than the amount of carbon black, accordingly a backing layer-forming coating solution can be prepared without performing roll kneading which is conventionally thought to be necessary. Further, since the amount of carbon black can be reduced, a residual amount of cyclohexane after drying can be reduced even if cyclohexanone is used as a solvent. A coated magnetic layer is dried after the ferromagnetic powder contained in the magnetic layer has been subjected to magnetic field orientation treatment. The magnetic field orientation treatment can be performed arbitrarily by well-known methods. After being dried, the magnetic layer is subjected to surface smoothing treatment by, e.g., super calender rolls. The holes generated by the removal of the solvent by drying vanish by the surface smoothing treatment and the packing rate of the ferromagnetic powder in the magnetic layer is improved. As a result, a magnetic recording medium having high electromagnetic characteristics can be obtained. As the rolls for calendering treatment, heat resisting plastic rolls, e.g., epoxy, polyimide, polyamide and polyamideimide are used. Metal rolls may also be used for the treatment.

It is preferred for the magnetic recording medium of the invention to have smooth surface. For obtaining smooth surface, it is effective to subject the magnetic layer which has been formed by selecting a specific binder as described above to calendering treatment. The calendering treatment is preferably performed at the temperature of the calender rolls of from 60 to 100° C., preferably from 70 to 100° C., and particularly preferably from 80 to 100° C., and the pressure of generally from 100 to 500 kg/cm (from 98 to 490 kA/m), preferably from 200 to 450 kg/cm (from 196 to 441 kA/m), and particularly preferably from 300 to 400 kg/cm (from 294 to 392 kA/cm). The obtained magnetic recording medium can be used by being cut to a desired size with a cutter and the like. The magnetic recording medium having been subjected to calendering treatment is generally heat-treated. In recent years, the reduction of a heat shrinkage factor is regarded as important for the linearity (the security of off-track margin) of a high density magnetic recording medium. In particular, with the trend of narrowing a track width, it is required to hold down a heat shrinkage factor in the machine direction under the use atmosphere to 0.07% or less. As the means of reducing a heat shrinkage factor, a method of heat-treating a magnetic recording medium in a web state while handling with low tension, and a method of heat-treating a magnetic recording medium in laminated states such as bulk or the case of encasing a tape in a cassette (thermo-treatment) are known.

EXAMPLES

The present invention will be described in detail below with reference to specific examples, but the present invention should not be construed as being limited thereto. In the examples, "part" means "mass part" unless otherwise indicated.

| Magnetic layer coating solution | |
|---|---|
| Ferromagnetic acicular metal powder | 100 parts |
| Polyurethane resin | 18 parts |
| UR 8200 (manufactured by Toyobo Co., Ltd., sulfonic acid group-containing polyurethane resin) | |
| Phenylphosphonic acid | 5 parts |
| α-Al$_2$O$_3$ (average particle size: 0.2 μm) | 10 parts |
| Carbon black (average particle size: 20 nm) | 0.5 parts |
| Cyclohexanone | 110 parts |
| Methyl ethyl ketone | 100 parts |
| Toluene | 100 parts |
| Butyl stearate | 2 parts |
| Stearic acid | 1 part |
| Lower layer coating solution | |
| α-Iron oxide powder average long axis length: 0.15 μm, average acicular ratio: 7, S$_{BET}$: 52 m$^2$/g | 85 parts |
| Carbon black (average particle size: 20 nm) | 15 parts |
| Vinyl chloride copolymer MR110 (manufactured by Nippon Zeon Co., Ltd.) | 13 parts |
| Polyurethane resin UR 8200 (manufactured by Toyobo Co., Ltd., sulfonic acid group-containing polyurethane resin) | 6 parts |
| Phenylphosphonic acid | 3 parts |
| α-Al$_2$O$_3$ (average particle size: 0.2 μm) | 1 part |
| Cyclohexanone | 140 parts |
| Methyl ethyl ketone | 170 parts |
| Butyl stearate | 2 parts |
| Stearic acid | 1 part |
| Backing layer coating solution | |
| α-Iron oxide powder average long axis length: 0.15 μm, average acicular ratio: 7, S$_{BET}$: 52 m$^2$/g | 80 parts |
| Carbon black (average particle size: 20 nm) | 20 parts |
| Carbon black (average particle size: 100 nm) | 3 parts |
| Vinyl chloride copolymer MR110 (manufactured by Nippon Zeon Co., Ltd.) | 13 parts |
| Polyurethane resin UR 8200 (manufactured by Toyobo Co., Ltd., sulfonic acid group-containing polyurethane resin) | 6 parts |
| Phenylphosphonic acid | 3 parts |
| α-Al$_2$O$_3$ (average particle size: 0.2 μm) | 3 parts |
| Cyclohexanone | 140 parts |
| Methyl ethyl ketone | 170 parts |
| Stearic acid | 3 parts |

With each of the above compositions for forming an upper magnetic layer coating solution, a lower layer coating solution and a backing layer coating solution, ingredients were kneaded in an open kneader for 60 minutes, and then dispersed in a sand mill for 240 minutes. A trifunctional low molecular weight polyisocyanate compound was added to each dispersion solution, in an amount of 3 parts to the magnetic layer coating solution, and 5 parts to the lower layer coating solution and the backing layer coating solution. Further, 40 parts of cyclohexanone was added to each coating solution. Each solution was filtered through a filter having an average pore diameter of 1 μm, thereby coating solutions for forming a magnetic layer, a lower layer and a backing layer were prepared.

The lower layer coating solution and the magnetic layer coating solution were simultaneously multilayer-coated on an aramid support having a thickness of 3.6 μm and a central plane average surface roughness of 2 nm. The lower layer coating solution was coated in a dry thickness of 1.2 μm, immediately thereafter the magnetic layer coating solution was coated on the lower layer in a dry thickness of 0.07 μm. The magnetic layer was subjected to orientation with a magnet having a magnetic force of 0.3 T while both layers were still wet. After drying, the layers were subjected to calendering treatment by a calender of 7 stages comprising metal rolls alone at 90° C., a velocity of 100 m/min and a linear pressure of 300 kg/cm (294 kN/m). Thereafter, a backing layer having a thickness of 0.5 μm was coated. The obtained web was slit to a width of ¼ inches. The magnetic layer surface of the thus-produced tape was cleaned with a tape cleaning apparatus having a delivery and a winding-up movement of a slit product to which a nonwoven fabric and a razor blade were attached so as to be pressed against the magnetic surface of the tape, thus a tape sample was obtained.

Examples 1 to 3 and Comparative Examples 1 to 6

Each magnetic tape was prepared in the same manner as above except for replacing the ferromagnetic metal powder in the magnetic layer with one shown in Table 1 below.

Methods of Measurement

1. Electromagnetic Characteristics

The measurement of electromagnetic characteristics was performed by a drum tester. Signal of recording wavelength 0.2 μm was recorded with a 1.5 T MIG head, reproduced with an MR head and analyzed with a spectrum analyzer. The ratio of the output obtained by the spectrum analyzer to the noise voltage ±0.5 MHz off the output was taken as C/N ratio. The relative speed of tape and head was 5 m/s. With the C/N value of Example 3 as 0 dB, the value of 0 dB or higher was taken as good.

2. Friction Coefficient of Tape

Friction Coefficient of One Hundredth Pass

A tape was wrapped round SUS 420J pole of 6 mmφ (roughness: 0.6 s) at an angle of 180° so that the magnetic surface came to be contact with the pole, and the tape was run 100 passes with a load of 20 g, at a speed of 14 mm/sec, at 23° C. 70% RH. The tension of the one hundredth pass at pulling the tape was measured and the friction coefficient of the tape was obtained by the Euler's equation.

Friction Coefficient of One Hundredth Pass after Storage

A friction coefficient was measured on the same measuring condition as above after storing the tape at 60° C. 90% RH for four weeks.

A value less than 0.35 was taken as good in each case.

3. Computation of Average Long Axis Length

The average long axis length of ferromagnetic metal powders of about 500 particles shown in the photographs of electron micrographs (magnification: 50,000) enlarged 4 times each in the machine direction and transverse direction was measured, and the average value was shown.

4. Measurement of Weather Resistance

After a magnetic recording medium was stored at 60° C. 90% RH for 7 days, the weather resistance of the magnetic layer was obtained from the reduction (Δφm) of the magnetic layer φm (maximum magnetic flux density).

Δφm (%)=100×(φm before storage−φm after storage)/φm before storage

The measurement was performed by a vibrating sample magnetometer VSM-5 (a product of Toei Kogyo Co., Ltd.), time constant of 0.1 sec., sweep speed of 3 min/796 kA/m, and measurement magnetic field of 796 kA/m.

Δφm less than 10% was taken as good.

TABLE 1

| Sample No. | Ferromagnetic Acicular Metal Powder | | | C/N (dB) | Friction Coefficient of 100th Pass | Friction Coefficient of 100th Pass after storage | Weather Resistance (%) |
| | Kind | Average Long Axis Length (nm) | Adhered amount of Carbon Black (mass %) | | | | |
| --- | --- | --- | --- | --- | --- | --- | --- |
| Example 1 | A | 45 | 15 | 1.8 | 0.3 | 0.31 | 5 |
| Example 2 | B | 35 | 5 | 0.9 | 0.32 | 0.34 | 8 |
| Example 3 | C | 48 | 5 | 0 | 0.33 | 0.28 | 7 |
| Comparative Example 1 | D | 55 | 15 | −0.8 | 0.29 | 0.33 | 4 |
| Comparative Example 2 | E | 60 | 5 | −1.9 | 0.32 | 0.29 | 5 |
| Comparative Example 3 | F | 100 | 10 | −4.7 | 0.26 | 0.31 | 3 |
| Comparative Example 4 | G | 45 | 0 | 1.1 | 0.34 | 0.41 | 20 |
| Comparative Example 5 | H | 52 | 0 | −0.2 | 0.33 | 0.44 | 15 |
| Comparative Example 6 | I | 40 | 0 | 1.5 | 0.37 | 0.5 | 23 |

The average long axis length of the ferromagnetic metal powder was measured after carbon black was adhered. The adhesion amount of carbon black was obtained by measuring the core particle powder.

From the above table, it can be seen that the samples using the acicular composite magnetic particle powders of the present invention are low in the friction coefficient of one hundredth pass and the friction coefficient of one hundredth pass after storage, and excellent both in C/N ratio and weather resistance, contrary to this, the comparative samples are inferior to the samples of the invention in any of these three items.

The present invention can provide a magnetic recording medium having various magnetic characteristics, i.e., the surface smoothness is improved, since the dispersibility of the acicular composite magnetic particle powder in the magnetic layer is excellent, although the powder comprises fine particles; running durability can be improved, since C/N ratio can be improved and the friction coefficient of the magnetic surface can be held down even under high temperature and high humidity conditions; and is excellent in weather resistance.

This application is based on Japanese Patent application JP 2002-253452, filed Aug. 30, 2002, the entire content of which is hereby incorporated by reference, the same as if set forth at length.

What is claimed is:

1. A magnetic recording medium comprising:

a support; and a magnetic layer comprising ferromagnetic metal powder and a binder, wherein the ferromagnetic metal powder is acicular composite magnetic particle powder having an average long axis length of from 20 to 50 nm, and at least a part of a surface of the particle powder is adhered with carbon black.

2. The magnetic recording medium according to claim 1, further comprising a lower layer so that the support, the lower layer and the magnetic layer is in this order, the lower layer being substantially nonmagnetic.

3. The magnetic recording medium according to claim 2, wherein the magnetic layer has a thickness of from 0.03 to 1 μm, and the lower layer has a thickness of from 0.5 to 3 μm.

4. The magnetic recording medium according to claim 2, wherein the lower layer comprises at least one of titanium dioxide, zinc oxide, iron oxide and barium sulfate.

5. The magnetic recording medium according to claim 2, wherein the lower layer comprises titanium dioxides or alpha-iron oxides.

6. The magnetic recording medium according to claim 2, wherein the lower layer further comprises carbon black.

7. The magnetic recording medium according to claim 1, wherein the average long axis length is from 20 to 45 nm.

8. The magnetic recording medium according to claim 1, wherein the acicular composite magnetic particle powder has an average acicular ratio of from 2.0 to 6.5.

9. The magnetic recording medium according to claim 1, wherein the acicular composite magnetic particle powder has an average acicular ratio of from 2.5 to 5.5.

10. The magnetic recording medium according to claim 1, further comprising a backing layer so that the magnetic layer, the support and the backing layer is in this order, the backing layer comprising an inorganic oxide powder.

11. The magnetic recording medium according to claim 10, wherein the inorganic oxide powder comprises titanium oxide or alpha-iron oxide.

12. The magnetic recording medium according to claim 11, wherein the inorganic oxide powder has a particle size of from 0.01 to 0.1 μm.

13. The magnetic recording medium according to claim 10, wherein at least a part of a surface of the inorganic oxide powder is covered with at least one compound selected from $Al_2O_3$, $SiO_2$, $TiO_2$, $ZrO_2$, $SnO_2$, $Sb_2O_3$ and $ZnO_2$.

14. The magnetic recording medium according to claim 10, wherein at least a part of a surface of the inorganic oxide powder is covered with at least one compound selected from $Al_2O_3$, $SiO_2$ and $ZrO_2$.

15. The magnetic recording medium according to claim 10, wherein the backing layer comprises a carbon black having a particle size of 0.3 μm or less.

* * * * *